(12) United States Patent
Naiem et al.

(10) Patent No.: US 9,705,748 B2
(45) Date of Patent: Jul. 11, 2017

(54) SITE DETECTION

(71) Applicant: HIVE STREAMING AB, Stockholm (SE)

(72) Inventors: Amgad Naiem, Stockholm (SE); Mohammed El-Beltagy, Stockholm (SE); Sondos Seif, Stockholm (SE)

(73) Assignee: HIVE STREAMING AB, Stockholm (SE)

( * ) Notice: Subject to any disclaimer, the term of this patent is extended or adjusted under 35 U.S.C. 154(b) by 192 days.

(21) Appl. No.: 14/333,738

(22) Filed: Jul. 17, 2014

(65) Prior Publication Data
US 2016/0020956 A1 Jan. 21, 2016

(51) Int. Cl.
*H04L 12/24* (2006.01)
*H04L 12/721* (2013.01)

(52) U.S. Cl.
CPC .......... *H04L 41/12* (2013.01); *H04L 41/0213* (2013.01); *H04L 41/046* (2013.01); *H04L 45/26* (2013.01)

(58) Field of Classification Search
CPC ... H04L 12/28; H04L 41/0213; H04L 41/046; H04L 41/12
See application file for complete search history.

(56) References Cited

U.S. PATENT DOCUMENTS 5,805,819 A * 9/1998 Chin ........................ H04L 41/22
709/218
6,915,309 B1 * 7/2005 Conley ................... H04L 41/12

2003/0128987 A1 * 7/2003 Mayer ................ H04Q 11/0062
398/98
2004/0264385 A1 12/2004 Hennessey
2007/0147375 A1 * 6/2007 Lee ........................ H04L 12/185
370/390

(Continued)

OTHER PUBLICATIONS

Jeff Doyle, Jennifer Dehaven Carroll, "A detailed examination of exterior routing protocols and advanced IP routing issues", CCIE Professional Development, Routing TCP/IP, vol. II, 2001.

*Primary Examiner* — Dung B Huynh
(74) *Attorney, Agent, or Firm* — Volpe and Koenig, P.C.

(57) ABSTRACT

The invention relates to a method and device of categorization of endpoint nodes into sites in a communications network. The invention further relates to a computer program performing the method according to the present invention, and a computer program product comprising computer readable medium having the computer programs embodied therein.

A method of categorizing endpoint nodes into sites in a communications network is provided. The method comprises acquiring information pertaining to tracing of a route from each of a plurality of the endpoint nodes via a number of routing nodes in the communications network, which information identifies the routing nodes encountered in each traced route. The method further comprises performing a comparison, for each of the plurality of endpoint nodes with the remaining ones of the plurality of endpoint nodes, of the acquired information for a selected number of routing nodes closest to the endpoint node for each traced route. Moreover, the method comprises categorizing the endpoint nodes having at least one routing node in common among the selected number of routing nodes as belonging to a same site.

12 Claims, 4 Drawing Sheets

(56) References Cited

U.S. PATENT DOCUMENTS

| | | | | |
|---|---|---|---|---|
| 2007/0147675 A1* | 6/2007 | Ulrici | ........................ | A61B 6/14 |
| | | | | 382/132 |
| 2008/0243996 A1* | 10/2008 | Wu | ........................ | H04L 65/608 |
| | | | | 709/203 |
| 2010/0185567 A1* | 7/2010 | Niemasik | ............. | G06N 99/005 |
| | | | | 706/12 |
| 2011/0138073 A1 | 6/2011 | Tanaka | | |
| 2011/0296051 A1 | 12/2011 | Vange et al. | | |
| 2012/0047253 A1* | 2/2012 | Garg | ................... | H04L 12/4625 |
| | | | | 709/224 |
| 2013/0122917 A1* | 5/2013 | Yavuz | ................... | H04J 3/0638 |
| | | | | 455/450 |
| 2013/0263227 A1* | 10/2013 | Gongaware | ............. | H04L 63/08 |
| | | | | 726/4 |
| 2014/0059200 A1* | 2/2014 | Nguyen | ................ | H04L 43/026 |
| | | | | 709/224 |

\* cited by examiner

SITE DETECTION

TECHNICAL FIELD

The invention relates to a method and device of categorization of endpoint nodes into sites in a communications network. The invention further relates to a computer program performing the method according to the present invention, and a computer program product comprising computer readable medium having the computer programs embodied therein.

BACKGROUND

Corporate networks generally have a large number of endpoint nodes, such as stationary computers, laptops, mobile phones, tablets, etc., in each site or location in the network. These endpoint nodes are connected to each other via one or more routers to form sub networks within a site, and a unique local Internet Protocol (IP) address must be assigned to each endpoint node in the site.

A site can thus contain multiple subnets, in particular if the site contains a large number of endpoint nodes. Network management in corporate networks is done by keeping track of IP range of each subnet router and identify the IP ranges that exist in each site.

For corporations having many sites in geographically dispersed locations, the network at each site may be managed by on-site network managers. Accordingly, the IP ranges of subnets within the site changes continuously and tracking of IP ranges becomes complex and time-consuming. This may be problematic for e.g. service providers installing software or infrastructure for which that information is important from a service performance perspective. Further, the process of managing a great number of subnets globally may be expensive and complex. There could be numerous services running inside a given corporation where site information is crucial for performance. Examples of such services are corporate live streaming, video conferencing, caching servers, etc.

SUMMARY

An object of the present invention is to solve, or at least mitigate, this problem in the art and to provide an improved method of discovering the site structure of these large networks.

This object is attained in a first aspect of the present invention by a method of categorizing endpoint nodes into sites in a communications network. The method comprises acquiring information pertaining to tracing of a route from each of a plurality of the endpoint nodes via a number of routing nodes in the communications network, which information identifies the routing nodes encountered in each traced route. The method further comprises performing a comparison, for each of the plurality of endpoint nodes with the remaining ones of the plurality of endpoint nodes, of the acquired information for a selected number of routing nodes closest to the endpoint node for each traced route. Moreover, the method comprises categorizing the endpoint nodes having at least one routing node in common among the selected number of routing nodes as belonging to a same site.

This object is attained in a second aspect of the present invention by a device configured to categorize endpoint nodes into sites in a communications network, the device comprising a processing unit being configured to acquire information pertaining to tracing of a route of each of a plurality of the endpoint nodes via a number of routing nodes in the communications network, said information identifying the routing nodes encountered in each traced route. Further, the processing unit is configured to perform a comparison, for each of the plurality of endpoint nodes with the remaining ones of the plurality of endpoint nodes, of the acquired information for a selected number of routing nodes closest to the endpoint node for each traced route, and categorize the endpoint nodes having at least one routing node in common among the selected number of routing nodes as belonging to a same site.

Further provided is a computer program performing the method according to the present invention, and a computer program product comprising computer readable medium having the computer programs embodied therein.

Thus, a route is traced from a respective endpoint node via a number of routers in the communications network. This could be performed e.g. by using the well-known traceroute computer network diagnostic tool. Typically, the route of each endpoint node in the network, or at least each end point in the network to subsequently be categorized into a site, is traced to a device such as a central data centre or a central corporate server. For performing a route trace, each end point node has client software installed that traces the route to the target central server. Information pertaining to the result of the respective traced route is sent to a device such as a network analysis server, which information identifies the routers encountered in each traced route.

Thereafter, a comparison of the acquired information for a selected number t of routers closest to the respective endpoint node for each traced route will be performed by the network analysis server, in order to identify router(s) common to the respective traced route. The endpoint nodes having at least one router in common among the t selected routers closest to the respective endpoint node is categorized as belonging to a same site.

Advantageously, the present invention facilitates categorization of endpoint nodes into sites for the subnets formed by a router and its associated endpoint nodes. This alleviates the need to perform a process at each endpoint node to identify to which site its subnet belongs. It further makes it easier to launch services that would make good use of such categorization without costly configuration and hand tuning.

Corporations typically have to maintain tables that keep track of which IP ranges (more or less synonymous with subnets) belong to each site. However, maintaining accurate tables is often burdensome and the tables that are at hand for a given point in time may be outdated due to constant changes occurring in the network. There is a cost associated with updating and uploading the most recent version of such a table to the service/software that might need the table. Outdated and non-accurate IP tables are thus problematic. An advantage of the present invention is that the endpoint nodes and their subnets can be categorized into sites, and the IP ranges for each subnet may thus be created more or less automatically. Thereby, the burden of manual table construction is alleviated. Further, a timely view of network sites and the endpoint nodes belonging to the respective network site is reliably provided and can thus be used by services/software that may depend upon this information.

The categorization of endpoint nodes into sites further facilitates delivering content to endpoint nodes in a corporate network using P2P approaches. By exploiting the proximity measure defined by a common router linking sites together, a more efficient order for distributing the streaming content can be established. By having peers preferentially download/upload content from other peers in their site, the P2P traffic can be kept local and outgoing and incoming site bandwidth better conserved. Pushing this further to having peer preferentially download/upload content from other peers in their subnet or neighbouring subnets within a site results in better content delivery performance while improving traffic locality even further. Additionally, knowledge of the site structure would allow an enterprise to limit the impact of security breaches when such breaches occur, by selectively cutting of, or quarantining, parts of the their network.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
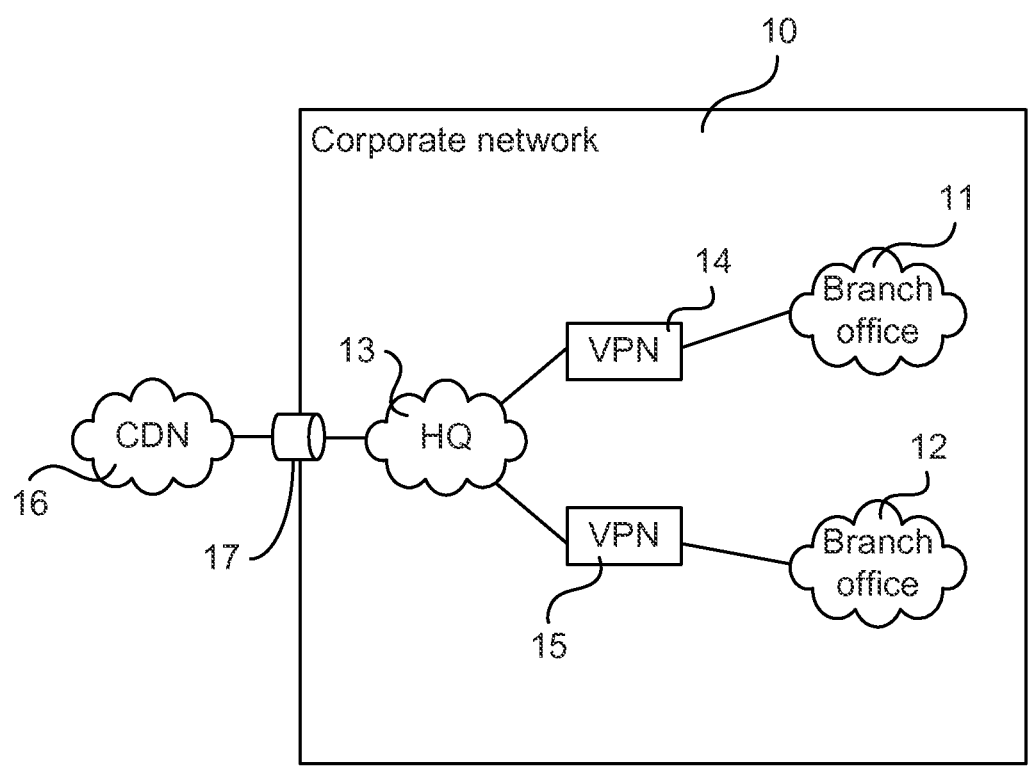
FIG. 1 illustrates a corporate network in which the present invention advantageously may be implemented.

FIG. 1 illustrates a corporate network 10 in which the present invention advantageously may be implemented. The corporate network 10 could be setup e.g. at a corporation or a public authority where multiple sites 11, 12 representing geographically distributed offices e.g. are connected to a main site 13 via fixed Virtual Private Network (VPN) links 14, 15, respectively.

Traffic from and to the public Internet, e.g. from/to a Content Data Network (CDN) 16, may enter the corporate network 10 via a gateway (GTW) link 17 of fixed capacity connected to the main site 13. The sites 11, 12, 13 are typically arranged according to a given hierarchy within the corporate network 10. At the highest level of the hierarchy is the main site 13, typically being the head quarter (or regional head quarter) of the organization implementing the corporate network 10. For example, in a corporate setting, the main site 13 may be a regional division of a multinational cooperation, while the regional sites 11, 12, may represent branch offices in the form of for instance two productions plants in that region.

In the sites, routers receive and forward packets to client nodes (not shown in FIG. 1) such as e.g. television sets, mobile phones, computers, tablets, smart phones, etc. Peer-to-peer (P2P) architectures can be used for transferring data between the routers and the client nodes.

Figure 2:
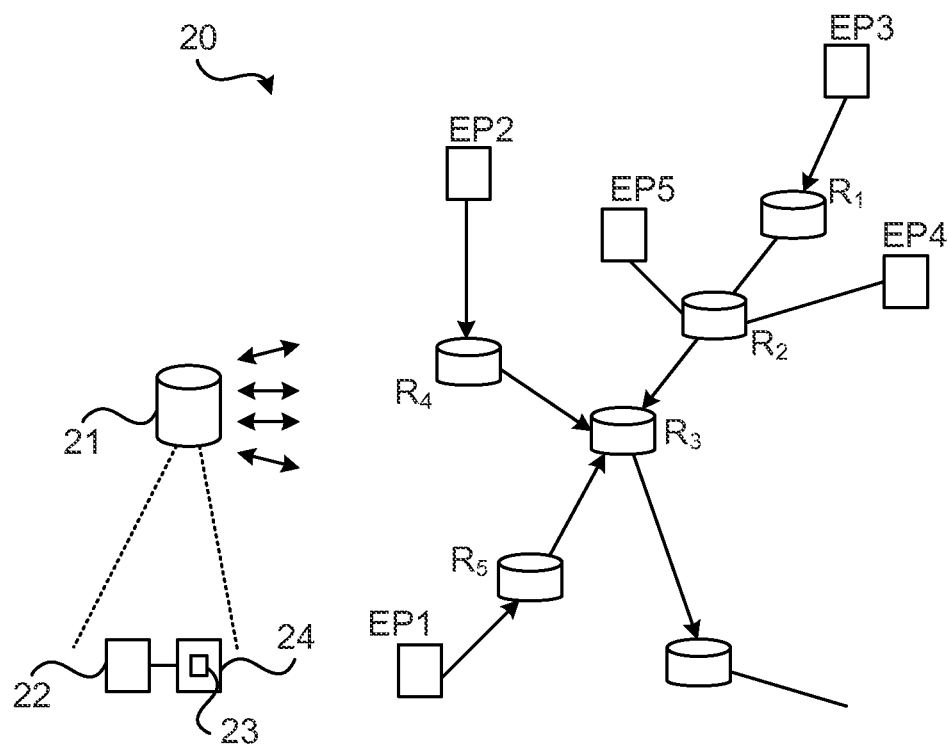
FIG. 2 illustrates a communications network in which a device according to an embodiment of the present invention is implemented.

FIG. 2 illustrates a communications network 20 in which a device 21 according to an embodiment of the present invention is implemented. The network 20 could for instance be arranged in any one of the branch office sites 11, 12 of FIG. 1. Now, the network 20 is exemplified to comprise five client nodes referred to as endpoint nodes $EP_1$-$EP_5$, and four routers $R_1$-$R_4$. In a real setting, the network 20 could comprise hundreds or even thousands of client nodes, where not all client nodes necessarily are endpoint nodes, but could be intermediate nodes. For instance, in case a P2P arrangement is implemented, the first router $R_1$ could forward data to an intermediate node (not shown) which in its turn forwards part or all of the data to the third endpoint node $EP_3$.

Figure 3:
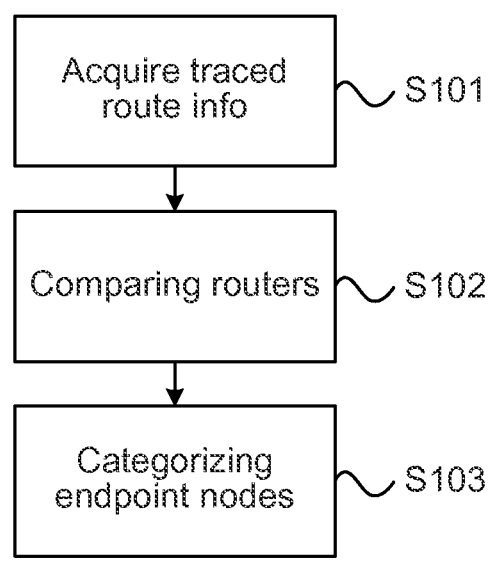
FIG. 3 further illustrates a flowchart of a method of categorizing endpoint nodes in sites according to an embodiment of the present invention.

FIG. 3 further illustrates a flowchart of a method of categorizing endpoint nodes in sites according to an embodiment of the present invention. This will be described with further reference to structural elements of FIG. 2.

In a first step S101, a route is traced from the respective endpoint node via a number of routers in the communications network 20. This could be performed e.g. by using the well-known traceroute computer network diagnostic tool. Typically, the route of each endpoint node in the network, or at least each end point in the network to subsequently be categorized, is traced to a device such as a central data centre or a central corporate server (not shown in FIG. 2). For performing a route trace, each end point node has client software installed that traces the route to the target central server. Information pertaining to the result of the respective route traced is sent to a device such as a network analysis server 21 according to an embodiment of the present invention. Alternatively, the network analysis server 21 could effect a trace of the respective from the central server to each endpoint node. Thus, in step S101, the network analysis server 21 acquires, from the endpoint nodes (or the central server), information pertaining to the tracing of the route from the respective endpoint node via the routers, which information identifies the routers encountered in each traced route.

Thereafter, in step S102, a comparison of the acquired information for a selected number t of routers closest to the respective endpoint node for each traced route will be performed by the network analysis server 21, in order to identify router(s) common to the respective traced route.

In the exemplified embodiment, the selected number of routers to compare is 2, i.e. t=2. When performing the trace of a route, the respective endpoint node acquires information identifying the routers encountered in each traced route. It should be noted that even though a large number of routers typically is traversed when performing a standard route trace procedure, it would for the sake of site detection suffice to traverse t routers in each route.

Thus, the first endpoint node $EP_1$ performs a route trace via the fifth router $R_5$ and the third router $R_3$, the second endpoint node $EP_2$ performs a route trace via the forth router $R_4$ and the third router $R_3$, and so on. Table 1 in the below summarizes the routers identified in each traced route for $t=2$.

TABLE 1

| Endpoint node | Routers encountered for t = 2 (router list) |
|---|---|
| $EP_1$ | $R_5$, $R_3$ |
| $EP_2$ | $R_4$, $R_3$ |
| $EP_3$ | $R_1$, $R_2$ |
| $EP_4$ | $R_2$, $R_3$ |
| $EP_5$ | $R_2$, $R_3$ |

Based on the information of Table 1, a pairwise comparison is performed by the network analysis server 21 for each endpoint node in step S102, where it initially can be concluded that the first endpoint node $EP_1$ has the router $R_3$ in common with $EP_2$, $EP_4$ and $EP_5$, but has no routers in common with the third endpoint node $EP_3$.

The encountered routers of each endpoint node are compared to the encountered routers of each of the other endpoint nodes, i.e. the router list for each endpoint node is compared to the router list of each of the other endpoint nodes. Thus:

1. The $EP_1$ router list is compared (as just described) with the respective router list of the other four endpoint nodes $EP_2$, $EP_3$, $EP_4$ and $EP_5$, resulting in $EP_1$ having the third router $R_3$ in common with $EP_2$, $EP_4$ and $EP_5$.
2. The $EP_2$ router list is compared with the respective router list of the other four endpoint nodes $EP_1$, $EP_3$, $EP_4$ and $EP_5$, resulting in the same common router $R_3$ as the comparison performed for $EP_1$; no new information is hence revealed in addition to that of the previous step.
3. The $EP_3$ router list is compared with the respective router list of the other four endpoint nodes $EP_1$, $EP_2$, $EP_4$ and $EP_5$, resulting in the second router $R_2$ being in common with the fourth endpoint node $EP_4$ and the fifth endpoint node $EP_5$.
4. The $EP_4$ router list is compared with the respective router list of the other four endpoint nodes $EP_1$, $EP_2$, $EP_3$ and $EP_5$, resulting in the same common router $R_3$ as the comparison performed for $EP_1$ and the same common router $R_2$ as the comparison performed for $EP_3$; no new information is hence revealed in addition to that of the previous steps.
5. The $EP_5$ router list is compared with the respective router list of the other four endpoint nodes $EP_1$, $EP_2$, $EP_3$ and $EP_4$, resulting in the same common router $R_3$ as the comparison performed for $EP_1$ and the same common router $R_2$ as the comparison performed for $EP_3$; no new information is hence revealed in addition to that of the previous steps.

Finally, in step S103, the endpoint nodes having at least one router in common among the t selected routers closest to the respective endpoint node is categorized as belonging to a same site.

Hence, as deducted under items 1 and 3 in the above:
(a) endpoint nodes $EP_1$, $EP_2$, $EP_4$ and $EP_5$ have router $R_3$ in common and are thus categorized to belong to the same site. This site will be referred to as $S_1$; and
(b) endpoint nodes $EP_3$, $EP_4$ and $EP_5$ have router $R_2$ in common and are thus categorized to belong to the same site, which is the site referred to as $S_1$ in which $EP_4$ and $EP_5$ already has been categorized according to item (a).

As a result, in the exemplifying embodiment of FIG. 2, all the endpoint nodes $EP_1$-$EP_5$ will be categorized in the same site $S_1$.

In an embodiment, in case two or more of the plurality of endpoints nodes previously were considered to be located in different sites, they are merged into the same site if they have at least one routing node in common among the selected number or routers.

The parameter t could be selected by a network manager, typically depending on the structure of the network 20. From a general point of view, a greater value of t results in a greater number of endpoint nodes being classified as belonging to the same site. If $t=1$, only endpoint nodes connected to the same router are classified as belonging to the same site.

With further reference to FIG. 2, the method of categorizing endpoint nodes in sites according to embodiments of the present invention is performed in a device such as the network analysis server 21, or any other appropriate network node. In practice, the method at the network analysis server 21 is performed by a processing unit 22 embodied in the form of one or more microprocessors arranged to execute a computer program 23 downloaded to a suitable storage medium 24 associated with the microprocessor, such as a Random Access Memory (RAM), a Flash memory or a hard disk drive. Thus, as is illustrated by means of dashed lines in FIG. 2, the processing unit 22 and the storage medium are included in the network analysis server 21. The processing unit 22 is arranged to carry out the method according to embodiments of the present invention when the appropriate computer program 23 comprising computer-executable instructions is downloaded to the storage medium 24 and executed by the processing unit 22. The storage medium 24 may also be a computer program product comprising the computer program 23. Alternatively, the computer program 23 may be transferred to the storage medium 24 by means of a suitable computer program product, such as a Digital Versatile Disc (DVD) or a memory stick. As a further alternative, the computer program 23 may be downloaded to the storage medium 24 over a network. The processing unit 22 may alternatively be embodied in the form of a digital signal processor (DSP), an application specific integrated circuit (ASIC), a field-programmable gate array (FPGA), a complex programmable logic device (CPLD), etc. Further, even though not shown in FIG. 2, the endpoint nodes $EP_1$-$EP_5$ and the routers $R_1$-$R_5$ typically comprise a corresponding processing unit and memory unit comprising a computer program executable by the processing unit.

Figure 4:
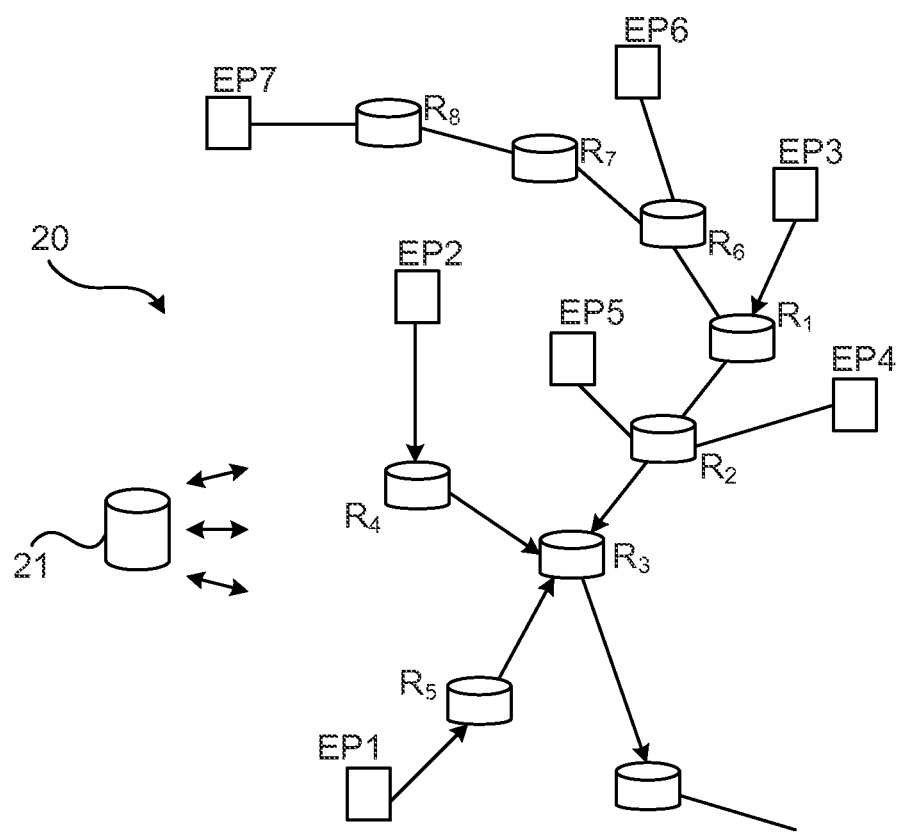
FIG. 4 illustrates a further embodiment of the present invention, where a further three routers and two endpoint nodes have been added to the communications network of FIG. 2.

FIG. 4 illustrates a further embodiment of the present invention, where a further three routers $R_6$, $R_7$, $R_8$ and two endpoint nodes $EP_6$, $EP_7$ have been added to the communications network 20.

Again, a route is traced from the respective endpoint node via a number of routers in the communications network 20 and information identifying encountered routers in the respective route is reported to the network analysis server 21.

Thereafter, a comparison of the acquired information for a selected number ($t=2$) of routers closest to the respective endpoint node for each traced route will be performed by the network analysis server 21, in order to identify router(s) common to the respective traced route.

Thus, as in the example illustrated with reference to FIGS. 2 and 3, the first endpoint node $EP_1$ performs a route trace via the fifth router $R_5$ and the third router $R_3$, the second endpoint node $EP_2$ performs a route trace via the fourth router $R_4$ and the third router $R_3$, and so on. Table 2 in the below summarizes the routers identified in each traced route in FIG. 4 for t=2.

TABLE 2

| Endpoint node | Routers encountered for t = 2 (router list) |
|---|---|
| $EP_1$ | $R_5, R_3$ |
| $EP_2$ | $R_4, R_3$ |
| $EP_3$ | $R_1, R_2$ |
| $EP_4$ | $R_2, R_3$ |
| $EP_5$ | $R_2, R_3$ |
| $EP_6$ | $R_6, R_1$ |
| $EP_7$ | $R_8, R_7$ |

Based on the information of Table 2, a pairwise comparison is performed by the network analysis server 21 for each endpoint node, where it initially can be concluded that the first endpoint node $EP_1$ has the third router $R_3$ in common with $EP_2$, $EP_4$ and $EP_5$, but has no routers in common with the third endpoint node $EP_3$, the sixth endpoint node $EP_6$ and the seventh endpoint node $EP_7$.

The encountered routers of each endpoint node are compared to the encountered routers of each of the other endpoint nodes, i.e. the router list for each endpoint node is compared to the router list of each of the other endpoint nodes. Thus:

1. The $EP_1$ router list is compared (as just described) with the respective router list of the other six endpoint nodes $EP_2$, $EP_3$, $EP_4$, $EP_5$, $EP_6$ and $EP_7$, resulting in $EP_1$ having the third router $R_3$ in common with $EP_2$, $EP_4$ and $EP_5$.
2. The $EP_2$ router list is compared with the respective router list of the other six endpoint nodes $EP_1$, $EP_3$, $EP_4$, $EP_5$, $EP_6$ and $EP_7$, resulting in the same common router $R_3$ as the comparison performed for $EP_1$; no new information is hence revealed in addition to that of the previous step.
3. The $EP_3$ router list is compared with the respective router list of the other six endpoint nodes $EP_1$, $EP_2$, $EP_4$, $EP_5$, $EP_6$ and $EP_7$, resulting in the second router $R_2$ being in common with the fourth endpoint node $EP_4$ and the fifth endpoint node $EP_5$, as well as the first router $R_1$ in common with the sixth endpoint node $EP_6$.
4. The $EP_4$ router list is compared with the respective router list of the other six endpoint nodes $EP_1$, $EP_2$, $EP_3$, $EP_5$, $EP_6$ and $EP_7$, resulting in the same common router $R_3$ as the comparison performed for $EP_1$ and the same common router $R_2$ as the comparison performed for $EP_3$; no new information is hence revealed in addition to that of the previous steps.
5. The $EP_5$ router list is compared with the respective router list of the other six endpoint nodes $EP_1$, $EP_2$, $EP_3$, $EP_4$, $EP_6$ and $EP_7$, resulting in the same common router $R_3$ as the comparison performed for $EP_1$ and the same common router $R_2$ as the comparison performed for $EP_3$; no new information is hence revealed in addition to that of the previous steps.
6. The $EP_6$ router list is compared with the respective router list of the other six endpoint nodes $EP_1$, $EP_2$, $EP_3$, $EP_4$, $EP_5$ and $EP_7$, resulting in the same common router $R_1$ as the comparison performed for $EP_3$; no new information is hence revealed in addition to that of the previous steps.
7. The $EP_7$ router list is compared with the respective router list of the other six endpoint nodes $EP_1$, $EP_2$, $EP_3$, $EP_4$, $EP_5$ and $EP_6$, resulting in no common routers.

Finally, the endpoint nodes having at least one router in common among the t selected routers closest to the respective endpoint node is classified as belonging to a same site.

Hence, as deducted under items 1 and 3 in the above:
(a) endpoint nodes $EP_1$, $EP_2$, $EP_4$ and $EP_5$ have router $R_3$ in common and are thus categorized to belong to the same site. This site will be referred to as $S_1$;
(b) endpoint nodes $EP_3$, $EP_4$ and $EP_5$ have router $R_2$ in common and are thus categorized to belong to the same site, which is the site referred to as $S_1$ in which $EP_4$ and $EP_5$ already has been classified according to item (a); and
(c) endpoint nodes $EP_3$ and $EP_6$ have router $R_1$ in common and are thus categorized to belong to the same site, which is the site referred to as $S_1$ in which $EP_3$ already has been classified according to item (b).

As a result, in the exemplifying embodiment of FIG. 4, all the endpoint nodes $EP_1$-$EP_7$ but one will be classified in the same site $S_1$.

Endpoint node $EP_7$ does not have any common routers with the remaining endpoint nodes for t=2, and is thus not categorized to belong to site $S_1$.

Figure 5:
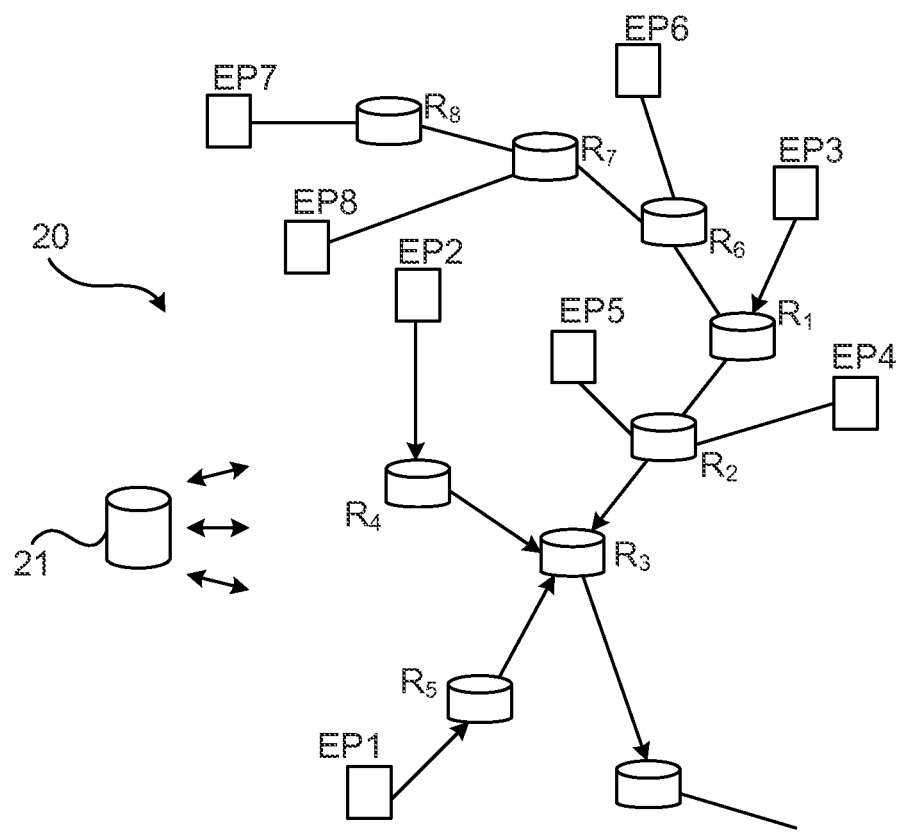
FIG. 5 illustrates a further embodiment of the present invention, where a further endpoint node has been added to the communications network of FIG. 4.

With reference to FIG. 5, a further endpoint node $EP_8$ has been connected to the router $R_7$. In this scenario, endpoint node $EP_8$ will be classified to belong to the site $S_1$ via router $R_6$ common with $EP_6$. Consequently, endpoint node $EP_7$ will also be considered to form part of the site $S_1$ via its common router $R_7$ with the endpoint node $EP_8$.

In still a further embodiment of the present invention, again with reference to FIG. 5, a concept of key routers is introduced. A key router is a first router encountered which an endpoint node has in common with other endpoint nodes, excluding the router to which the endpoint node is directly connected. In other words, as previously has been discussed, each router and the endpoint nodes connected to it form a subnet in the communications network. In this particular embodiment, a firstly encountered router in a traced route being in common to at least two subnets is identified.

Thus, as can be seen in FIG. 5, for the subnets formed by the second endpoint node $EP_2$ and its associated fourth router $R_4$, and by the first endpoint node $EP_1$ and its associated fifth router $R_5$, respectively, the first common router is the third router $R_3$. The third router $R_3$ is hence the key router for these two subnets, and the endpoint nodes $EP_1$ and $EP_2$ are thus classified as belonging to the same site. Further, the subnet formed by the fourth and fifth endpoints $EP_4$ and $EP_5$ and the second router $R_2$ also has the third router $R_3$ in common with the first and second endpoints $EP_1$ and $EP_2$, and so on. In this respect, the third router $R_3$ is the key router for the three subnets formed by $R_2$, $R_4$ and $R_5$, respectively, and the associated endpoint nodes $EP_1$, $EP_2$, $EP_4$ and $EP_5$ are thus categorized to belong to the same site.

In an embodiment of the present invention, after the identification of key routers, a pairwise comparison is performed for all the in the communications network 20. If any two subnets have the same key router, they are considered to belong to the same site. Consequently, if two subnets that were earlier identified to be in two different sites share the same key router, then these two sites are merged together into a single site and all the endpoint nodes in these two previously separate sites now belong to the new merged site.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of categorizing endpoint nodes into sites in a communications network, the method comprising:
   acquiring, by a network analysis server device, information pertaining to tracing of a route of each of a plurality of the endpoint nodes via a number of routing nodes in the communications network, said information identifying the routing nodes encountered in each traced route, wherein the number of routing nodes encountered in each traced route of an endpoint node depends upon the endpoint node;
   performing, by the network analysis server device, a comparison, for each of the plurality of endpoint nodes with the remaining ones of the plurality of endpoint nodes, of the acquired information for a selected number (t) of routing nodes closest to the endpoint node for each traced route, wherein the selected number (t) of routing nodes depends upon the structure of the communications network;
   categorizing, by the network analysis server device, a first endpoint node of the plurality of endpoint nodes as belonging to a same site as a second endpoint node of the plurality of endpoint nodes, on a condition that the first endpoint node has at least one routing node among the selected number (t) of routing nodes in common with the second endpoint node; and
   categorizing, by the network analysis server device, the first endpoint as not belonging to the same site as the second endpoint node, on a condition that the first endpoint does not have at least one routing node among the selected number (t) of routing nodes in common with the second endpoint node.

2. The method of claim 1, wherein the step of performing a comparison comprises performing a pairwise comparison between each individual endpoint node and the remaining endpoint nodes.

3. The method of claim 1, wherein each routing node and the endpoint nodes connected to said each routing node form a subnet in the communications network, the method further comprising:
   identifying, by the network analysis server device, a firstly encountered routing node in a traced route being in common to at least two subnets; and
   categorizing, by the network analysis server device, the endpoint nodes of said at least two subnets as belonging to the same site.

4. The method of claim 3, further comprising:
   performing, by the network analysis server device, a comparison of the identified firstly encountered routing node of each subnet with the identified firstly encountered routing node of the remaining subnets.

5. A network analysis server device configured to categorize endpoint nodes into sites in a communications network, the network analysis server device comprising:
   a processing unit operatively coupled to a transceiver, the transceiver and the processing unit being configured to acquire information pertaining to tracing of a route of each of a plurality of the endpoint nodes via a number of routing nodes in the communications network, said information identifying the routing nodes encountered in each traced route, wherein the number of routing nodes encountered in each traced route of an endpoint node depends upon the endpoint node;
   the processing unit being configured to perform a comparison, for each of the plurality of endpoint nodes with the remaining ones of the plurality of endpoint nodes, of the acquired information for a selected number (t) of routing nodes closest to the endpoint node for each traced route, wherein the selected number (t) of routing nodes depends upon the structure of the communications network;
   the processing unit and the transceiver being configured to categorize a first endpoint node of the plurality of endpoint nodes as belonging to a same site as a second endpoint node of the plurality of endpoint nodes, on a condition that the first endpoint at least one routing node among the selected number (t) of routing nodes in common with the second endpoint node; and
   the processing unit and the transceiver being configured to categorize the first endpoint as not belonging to the same site as the second endpoint node, on a condition that the first endpoint does not have at least one routing node among the selected number (t) of routing nodes in common with the second endpoint node.

6. The network analysis server device of claim 5, the processing unit further being configured to perform a pairwise comparison between each individual endpoint node and the remaining endpoint nodes.

7. The network analysis server device of claim 5, wherein each routing node and the endpoint nodes connected to said each routing node form a subnet in the communications network, network analysis server device unit further comprising:
   the processing unit being configured to identify a firstly encountered routing node in a traced route being in common to at least two subnets; and
   the processing unit and the transceiver being configured to categorize the endpoint nodes of said at least two subnets as belonging to the same site.

8. The network analysis server device of claim 7, the processing unit further being configured to:
   perform a comparison of the identified firstly encountered routing node of each subnet with the identified firstly encountered routing node of the remaining subnets.

9. A non-transitory computer-readable medium, the computer readable medium having processor executable instructions stored thereon, which when executed by the at least one processing unit, will cause the at least one processing unit to perform a method of categorizing endpoint nodes into sites in a communications network, the method comprising:
   acquiring information pertaining to tracing of a route of each of a plurality of the endpoint nodes via a number of routing nodes in the communications network, said information identifying the routing nodes encountered in each traced route, wherein the number of routing nodes encountered in each traced route of an endpoint node depends upon the endpoint node;
   performing a comparison, for each of the plurality of endpoint nodes with the remaining ones of the plurality of endpoint nodes, of the acquired information for a selected number (t) of routing nodes closest to the endpoint node for each traced route, wherein the selected number (t) of routing nodes depends upon the structure of the communications network;
   categorizing a first endpoint node of the plurality of endpoint nodes as belonging to a same site as a second endpoint node of the plurality of endpoint nodes, on a condition that the first endpoint node has at least one routing node among the selected number (t) of routing nodes in common with the second endpoint node; and
   categorizing the first endpoint as not belonging to the same site as the second endpoint node, on a condition that the first endpoint does not have at least one routing node among the selected number (t) of routing nodes in common with the second endpoint node.

10. The non-transitory computer readable medium of claim 9, wherein the step of performing a comparison comprises performing a pairwise comparison between each individual endpoint node and the remaining endpoint nodes.

11. The non-transitory computer readable medium of claim 9, wherein the method further comprises:
   identifying, by the network analysis server device, a firstly encountered routing node in a traced route being in common to at least two subnets; and
   categorizing, by the network analysis server device, the endpoint nodes of said at least two subnets as belonging to the same site.

12. The non-transitory computer readable medium of claim 11, wherein the method further comprises:
   performing, by the network analysis server device, a comparison of the identified firstly encountered routing node of each subnet with the identified firstly encountered routing node of the remaining subnets.

* * * * *